US007765036B2

(12) United States Patent
Bouchet

(10) Patent No.: US 7,765,036 B2
(45) Date of Patent: Jul. 27, 2010

(54) DEVICE FOR CONSTRUCTING AND SECURING A LOW ALTITUDE FLIGHT PLAN PATH INTENDED TO BE FOLLOWED BY AN AIRCRAFT

(75) Inventor: Christophe Bouchet, Toulouse (FR)

(73) Assignee: Airbus France, Toulouse (FR)

( * ) Notice: Subject to any disclaimer, the term of this patent is extended or adjusted under 35 U.S.C. 154(b) by 740 days.

(21) Appl. No.: 11/672,393

(22) Filed: Feb. 7, 2007

(65) Prior Publication Data

US 2008/0001024 A1 Jan. 3, 2008

(30) Foreign Application Priority Data

Feb. 8, 2006 (FR) .................................. 06 01102

(51) Int. Cl.
*G01C 23/00* (2006.01)

(52) U.S. Cl. .............................. 701/3; 340/945; 701/4; 701/11; 701/14

(58) Field of Classification Search ................ 244/75.1, 244/3.15, 189; 701/3, 14, 208, 301, 11, 120; 340/970, 945, 961, 963; 342/65, 118
See application file for complete search history.

(56) References Cited

U.S. PATENT DOCUMENTS 5,826,834 A * 10/1998 Potter et al. ................. 244/195
2005/0261811 A1 11/2005 Artini et al.
2007/0150170 A1* 6/2007 Deker ......................... 701/120
2008/0208400 A1* 8/2008 Bouchet et al. ................. 701/4
2009/0076728 A1* 3/2009 Bouchet et al. ............. 701/301

FOREIGN PATENT DOCUMENTS

| | | |
|---|---|---|
| EP | 0750238 | 12/1996 |
| EP | 1602995 | 12/2005 |
| FR | 2870604 | 11/2005 |
| FR | 2870607 | 11/2005 |
| WO | 2005069094 | 7/2005 |

OTHER PUBLICATIONS

The Avionics Handbook, edited by Cary R. Spitzer, 2001 by CRC Press LLC (Chapter 27).*
Airbus Industrie A319/A320/A321 Fight Crew Training Manual, May 1998 by Airbus Industrie, Rev 21, (Chapters 02\14 and 03\10).*
Preliminary Search Report dated Nov. 9, 2006.

* cited by examiner

*Primary Examiner*—Khoi Tran
*Assistant Examiner*—Stephen Holwerda
(74) *Attorney, Agent, or Firm*—Dickinson Wright PLLC

(57) ABSTRACT

A device for constructing and securing a low altitude flight path intended to be followed by an aircraft. The device includes a first processing unit which has a Design Assurance Level (DAL) C requirement level and which determines a low altitude flight path, using data coming from a first database qualified according to a Data Process Assurance Level (DPAL) 2 standard, and a second processing unit which has a DAL A requirement level and which checks the flight path determined by said first processing unit, using data corning from a second database qualified according to a DPAL1 standard.

2 Claims, 1 Drawing Sheet

DEVICE FOR CONSTRUCTING AND SECURING A LOW ALTITUDE FLIGHT PLAN PATH INTENDED TO BE FOLLOWED BY AN AIRCRAFT

BACKGROUND OF THE INVENTION

The present invention relates to a device for constructing and securing a low altitude flight path intended to be followed by an aircraft, in particular a military transport aircraft.

In the context of the present invention, the term low altitude flight path means a flight path which allows an aircraft to follow the flown-over terrain very closely, in particular for preventing it from being spotted, whilst eliminating all risk of collision with a part of said terrain. Such a flight path is generally situated at a predetermined height above the terrain, for example at 500 feet (about 150 meters).

DESCRIPTION OF THE PRIOR ART

From the document FR-2 870 607, there is known a method and a device for constructing such a low altitude flight path.

Because of the proximity to the ground, it is necessary that the low altitude flight path is compatible with the capabilities of the aircraft, that is to say that the latter is capable of following it. In fact, an excessive deviation with respect to that flight path would be able to have catastrophic consequences, in particular with a large risk of collision with the terrain flown over or with a construction or an object situated on said terrain. In order to overcome this disadvantage, from the document FR-2 870 604 there is known a device and a method for securing such a low altitude flight of an aircraft, in order to obtain a sufficient degree of safety making it possible to eliminate all risk of collision of the aircraft with the terrain flown over.

The purpose of the present invention is to construct such a low altitude flight path and also to secure it, that is to say to ensure that the aircraft is able to fly this flight path.

As an automatic low altitude flight function which uses such a flight path can lead to the loss of the aircraft in the case of failure, this function must be certified by demonstrating the highest level of integrity. In particular, the database or databases used for constructing and securing the low altitude flight path must be qualified at the required level of integrity. This can only be done by applying very strict standards with regard to the representativeness and the integrity of the recorded data. Such requirements have negative consequences, in particular with regard to the cost of the database or databases. Moreover, the low altitude flight function must be robust with respect to a failure of an engine of the aircraft, such a failure being considered as always possible.

SUMMARY OF THE INVENTION

The purpose of the present invention is to overcome these disadvantages. It relates to a device for constructing and securing a low altitude flight path intended to be followed by an aircraft, which makes it possible both to secure the flight path with respect to an engine failure of the aircraft and to ensure the representativeness of at least one model used with respect to the certified performance of the aircraft.

For this purpose, according to the invention, said device comprises:

- a first processing unit which has a DAL C requirement level and which is formed in such a way as to determine said flight path, making use of data coming from a first database;

- said first database, which is qualified according to a DPAL2 standard and which contains precalculated performance of the aircraft, making it possible to provide a maximum climb gradient flyable by the aircraft, with all of the engines functioning, depending on a plurality of parameters including the speed of the aircraft, this performance being saturated on the best climb gradient flyable by the aircraft with one failed engine;
- a second processing unit which has a DAL A requirement level and which is formed in such a way as to check the flight path determined by said first processing unit, using data coming from a second database; and
- said second database, which is qualified according to a DPAL1 standard and which contains precalculated regulation and certified performance of the aircraft, making it possible to provide a maximum climb gradient flyable by the aircraft with one failed engine and to do so uniquely for a best gradient speed.

Thus, due to the invention, the functions used by said device are carried out by two separate processing units, each of which is associated with a special database. One of said processing units carries out the construction and the other one carries out the securing. The association of these two processing units allows the construction of a low altitude flight path which is secured with respect to the failure of an engine, but for which the operational speed range is not degraded in terms of maximum climb gradient. This makes it possible to use the full performance of the aircraft when it is following said low altitude flight path.

It is known that the safety analysis leads to classifying the functions (or the software) according to the risk that a malfunction of said function (or of said software) would cause the aircraft to run. In the present invention, the function used is classified as “catastrophic”. This type of classification (in this instance “catastrophic”) imposes a certain level of development rules (“A” in this instance): the term DAL A is then used. The link between the level of criticality and the development requirements is defined by a document entitled “RTCA-EUROCAE DO-178b/ED-12b” which is the standard approved by the aeronautical community. This document was drawn up by the organizations RTCA (Requirements and Technical Concepts for Aviation) and EUROCAE (European Organisation for Civil Aviation Equipment).

Furthermore, the document SAE-ARP4754 (SAE standing for “Society of Automotive Engineers” and ARP for “Aeronautic Recommended Practices”) specifies that in a split function, in order to obtain the equivalent of a level A function, one of the two branches must be of level A and the other one at least of level C. Consequently according to this standard, the choice according to the present invention is to take the construction function to level C and the monitoring function to level A.

Moreover, the standard “RTCA-EUROCAE DO-200a/ED76” makes the link between the DAL (Design Assurance Level) level [levels A and C respectively in the present invention] and the DPAL (Data Process Assurance Level) level [1 and 2 respectively in the present invention]. The DO-200a standard also defines the requirements associated with each of the DPAL levels and the possible means of conformity in order to meet these requirements.

In the context of the present invention, the following definitions are taken into account:

- level A (DAL A): software whose malfunction would cause or contribute to a failure of a function of a system resulting in a catastrophic failure condition for the aircraft (able to lead to the loss of the aircraft and of its occupants);

level C (DAL C): software whose malfunction would cause or contribute to a failure of a function of the system resulting in a major failure condition for the aircraft;

level 1 (DPAL1): requirement level relating to the control of the integrity, during the elaboration process, of data intended for a function or a sub-function of level A or B software (DAL A or DAL B); and level 2 (DPAL2): requirement level relating to the control of the integrity, during the elaboration process, of data intended for a function or a sub-function of level C or D software (DAL C or DAL D).

It will be noted that, due to the present invention, said first database which makes it possible to model the gradients flyable by the aircraft is qualified according to the DPAL2 standard, that is to say according to a standard which it not too restrictive. The qualification efforts are therefore concentrated on the second database which is qualified according to the DPAL1 standard. The latter comprises regulation performance, that is to say performance which has already been certified by the air authorities. This considerably simplifies the work of qualification of this second database, and therefore also the work of qualification of the device according to the invention.

Said device also has other advantages described below.

BRIEF DESCRIPTION OF THE DRAWING

The figures of the attached drawing will give a good understanding of how the invention can be embodied. In these figures, identical references indicate similar components.

DESCRIPTION OF THE PREFERRED EMBODIMENTS

Figure 1:
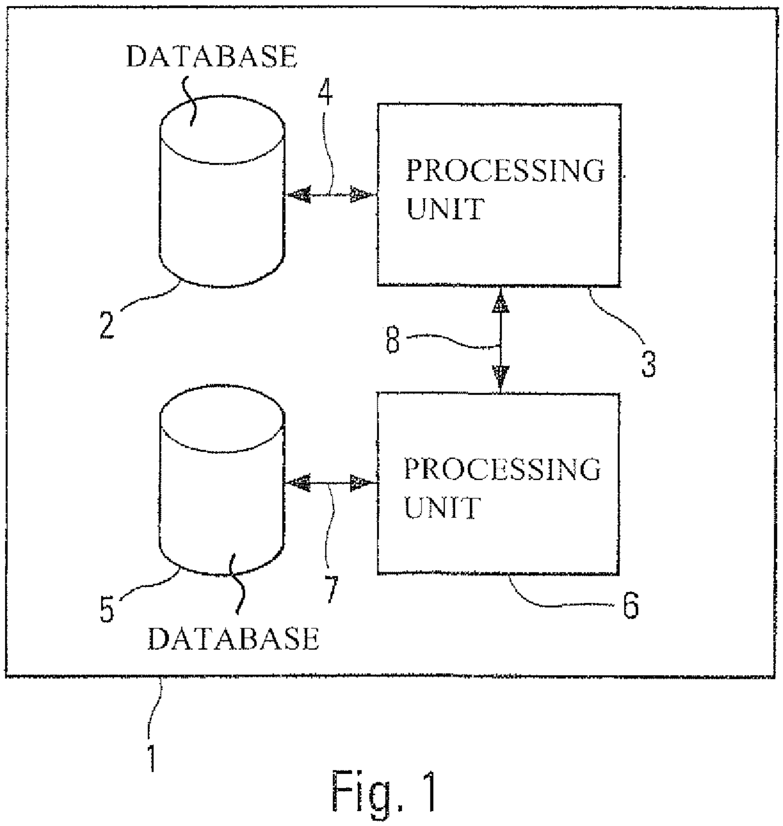
FIG. 1 is a block diagram of a device according to the invention.

The device 1 according to the invention and shown as a block diagram in FIG. 1 is intended to construct and to secure a low altitude flight path which is intended to be followed by an aircraft, a military transport aircraft in particular. The flight path determined by said device 1 can be used by a usual automatic guidance system which has not described further hereafter.

In order to do this, said device 1 comprises, according to the invention:

a database 2 which is qualified according to a DPAL2 standard and which contains precalculated performance data of the aircraft, making it possible to provide a maximum climb gradient flyable by the aircraft, with all of the engines functioning, according to a plurality of parameters (including the speed of the aircraft). Moreover, this performance is saturated on the best climb gradient flyable by the aircraft with one failed engine, as described below;

a processing unit 3 which is connected by the intermediary of a link 4 to said database 2, which has a DAL C requirement level and which is formed in such a way as to determine said flight path, using data coming from said database 2;

a database 5 which is qualified according to a DPAL1 standard which contains precalculated regulation and certified performance data of the aircraft, making it possible to provide a maximum climb gradient flyable by the aircraft with one failed engine, and to do this uniquely for a best gradient speed, described below; and a processing unit 6 which is respectively connected by the intermediary of links 7 and 8 to said database 5 and to said processing unit 3, which has a DAL A requirement level, and which is formed in such a way as to check the flight path determined by said processing unit 3, using data coming from said database 5.

In the context of the present invention, the following definitions are taken into account:

level A (DAL A): software whose malfunction would cause or contribute to a failure of a function of the device 1 resulting in a catastrophic failure condition for the aircraft (able to lead to the loss of the aircraft and of its occupants);

level C (DAL C): software whose malfunction would cause or contribute to a failure of a function of the device 1 resulting in a major failure condition for the aircraft;

level 1 (DPAL 1): requirement level relating to the control of the integrity, throughout the elaboration process, of data intended for a function or a sub-function of level A or B (DAL A or DAL B) software; and level 2 (DPAL 2): requirement level relating to the control of the integrity, throughout the elaboration process, of data intended for a function or a sub-function of level C or D (DAL C or DAL D) software.

Thus, due to said architecture of the device 1 according to the invention, the gradients flyable by the aircraft can be modelled in the database 2 which is qualified according to the DPAL2 standard which is not too restrictive, and the qualification efforts are concentrated on the database 5 which is qualified according to the highly restrictive DPAL1 standard, but which advantageously comprises regulation performance data.

Figure 2:
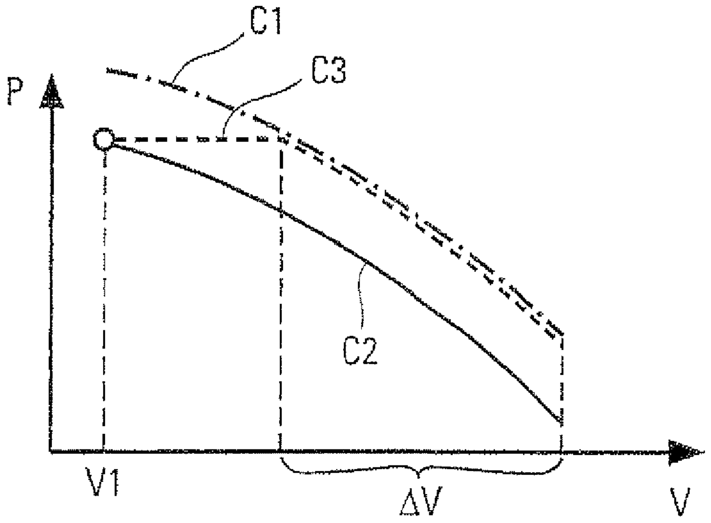
FIG. 2 is a graph making it possible to use an essential feature of the present invention.

Moreover, as mentioned above, the precalculated performance contained in the database 2 is saturated on the best climb gradient flyable by the aircraft with one failed engine. This characteristic is shown in FIG. 2 which illustrates the variation of the maximum climb gradient P as a function of the speed V, and it does so:

for a curve C1 shown in dotted and dashed line, illustrating the functioning with all engines valid;

a curve C2 shown in full line, illustrating the functioning with one failed engine; and a curve C3 in dashed line, illustrating the model used for said database 2.

Thus, in the case of failure of an engine, the aircraft has the possibility of decelerating the current speed to the equilibrium speed for maintaining the gradient of the low altitude flight path. This low altitude flight path is therefore secure with respect to the failure of an engine. Thus, the use of the whole performance potential of the aircraft is continued for the speed range ΔV for which the gradients are not saturated.

Moreover, in a particular embodiment, this speed range ΔV (which therefore exhibits a nondegraded performance and which is shown in FIG. 2) corresponds to the operational use range of a low altitude flight function.

Furthermore, as mentioned above, said database 5 contains precalculated regulation performance data making it possible to provide a maximum climb gradient flyable by the aircraft with one failed engine, and to do so uniquely for a best gradient speed V1. It is thus ensured that, in the case of the failure of an engine, the aircraft is still capable of maintaining its flight gradient, subject to decelerating. Therefore there is always an equilibrium speed point on the low altitude flight path which guarantees that the aircraft can fly that flight path and that it can do so even with one failed engine.

Moreover, as the model in said database 5 uses regulation performance data, that is to say performance certified by the air authorities, the work of qualification of that database 5 to the DPAL1 standard is considerably simplified (the initial data being valid by definition).

Furthermore, in a preferred embodiment, the best gradient speed V1 with one failed engine is a speed which is called the "Greendot" speed for aircraft of the AIRBUS type. This Greendot speed is generally that which is used for the calculation of the certified performance considered in the present invention. Furthermore, this speed is also that used in general by the speed envelope control computers in order to set the bottom limits for the speeds accessible by the aircraft in managed mode during automatic flight. Thus, during an automatic flight (under the control of an automatic pilot) along the low altitude flight path, when an engine failure occurs, in order to maintain the current flight gradient and the clearance of the aircraft with respect to the relief, the speed of the aircraft will reduce automatically in such a way as to find a new point of equilibrium (thrust of the aircraft, gradient, speed). In the case where the gradient being flown prior to the engine failure is the highest possible (curve C3 of FIG. 2), this new equilibrium speed point is the speed V1 (FIG. 2) that is to say the Greendot speed.

It will be noted that the introduction of the Greendot speed as a calculation speed for the maximum gradients flyable with a failed engine guarantees a homogeneous functioning of the function both in manual flight and in automatic flight (under the control of an automatic pilot). In fact:

in manual flight, the set speed in the case of an engine failure is said Greendot speed; and in automatic flight, if the automatic pilot cannot simultaneously comply with gradient and speed commands, it will automatically make the aircraft decelerate down to the Greendot speed.

Moreover, as mentioned above, the Greendot speed for a failed engine is also the speed which is used for the calculation of the regulation (certified) performance. The use of this regulation performance considerably reduces the work of qualification of the database (required by said DO-200a standard) and of the associated elaboration procedure, to the DPAL1 standard.

What is claimed is:

1. A device to construct and secure a low altitude flight path of an aircraft, such that the aircraft closely follows the terrain of the flight path at a predetermined altitude, said device comprising:

a first processing unit which has a Design Assurance Level (DAL) C requirement level formed to determine said flight path, using data coming from a first database, wherein said first database, which is qualified according to a Data Processing Assurance Level (DPAL) 2 standard and which includes precalculated performance of the aircraft, configured to provide a first maximum climb gradient flyable by the aircraft, with all of the engines functioning, depending on a plurality of parameters including speed of the aircraft, the performance being saturated on a best climb gradient flyable by the aircraft with one failed engine; and a second processing unit which has a DAL A requirement level and formed in to check the flight path determined by said first processing unit, using data coming from a second database, wherein:

said second database, which is qualified according to a DPAL 1 standard and includes precalculated regulation performance of the aircraft, configured to provide a second maximum climb gradient flyable by the aircraft with one failed engine and to do so uniquely for a best gradient speed.

2. An aircraft, comprising a device as claimed in claim 1.

* * * * *